(12) United States Patent
Eidelman et al.

(10) Patent No.: US 9,475,027 B1
(45) Date of Patent: Oct. 25, 2016

(54) METHOD AND APPARATUS FOR SHOCKWAVES PROCESSING

(71) Applicants: Shmuel Eidelman, Rockville, MD (US); Gabriel Eidelman, Rockville, MD (US)

(72) Inventors: Shmuel Eidelman, Rockville, MD (US); Gabriel Eidelman, Rockville, MD (US)

(73) Assignee: Shmuel Eidelman, Rockville, MD (US)

( * ) Notice: Subject to any disclaimer, the term of this patent is extended or adjusted under 35 U.S.C. 154(b) by 0 days.

(21) Appl. No.: 14/990,461

(22) Filed: Jan. 7, 2016

(51) Int. Cl.
    *B01J 19/10*     (2006.01)
    *B01J 3/08*     (2006.01)

(52) U.S. Cl.
    CPC   *B01J 19/10* (2013.01); *B01J 3/08* (2013.01); *B01J 2219/089* (2013.01); *B01J 2219/0869* (2013.01); *B01J 2219/0877* (2013.01); *B01J 2219/19* (2013.01)

(58) Field of Classification Search
    CPC ........ B01J 19/10; B01J 3/08; B01J 2219/19; B01J 2219/0869; B01J 2219/089; B01J 2219/0877
    USPC .............. 204/156–158.21; 422/20, 186–187
    See application file for complete search history.

(56) References Cited

U.S. PATENT DOCUMENTS

| | | | | |
|---|---|---|---|---|
| 4,207,154 A | * | 6/1980 | Lemelson | B01J 19/121 204/157.41 |
| 5,197,323 A | * | 3/1993 | Osofsky | G01N 3/307 73/12.01 |
| 8,840,835 B1 | * | 9/2014 | Eidelman | A61L 2/02 204/157.15 |
| 2004/0166055 A1 | * | 8/2004 | Stickney | B01J 19/12 422/600 |

* cited by examiner

*Primary Examiner* — Colleen M Raphael

(57) ABSTRACT

A method for processing liquids and suspensions using shockwaves that includes providing an apparatus including a shockwaves generation section and a shockwaves processing section; placing media to be processed into the shockwaves processing section through continuous or intermittent injection; introducing a pressurizing gas into the shockwaves generation section; introducing a detonable mixture into the shockwaves generation section; causing formation of at least one of a shockwave within the shockwaves generation section by igniting the detonable mixture so that at least one of a shockwave propagates from detonation section into shockwaves processing section; utilizing physical, chemical, biological or mechanical effects of the shockwaves in the shockwaves processing section; venting detonation products from the shockwaves generation section via a pressure relief valve; and repeating to achieving a predetermined degree of processing liquids, liquid suspension, colloids, gels, pastes located in the shockwaves processing section.

20 Claims, 8 Drawing Sheets

METHOD AND APPARATUS FOR SHOCKWAVES PROCESSING

BACKGROUND OF THE INVENTION

1. Field of the Invention

The present invention generally relates to an apparatus and to a method for processing with shockwaves or high amplitude acoustic waves.

2. Background

There is a critical need for efficient generation of high intensity shockwaves in liquids and suspensions. High pressure shockwaves propagating through a liquid can be utilized for killing microorganisms contained in the liquid, disrupting biological cells contained in the liquid suspension, enabling gene and drug transfer through cell walls, promoting chemical reactions in the liquids, increasing production of alcohol in bioreactor, and other applications. Depending on processing needs one may require different characteristics of shockwaves for specific processing goals. Unfortunately, there are very limited means for generations of high intensity shockwaves for processing. Shockwaves in liquids can be generated using electric discharge in liquid, laser beam impacting the liquid, or focused acoustic waves generated by an array of piezoactuators. Unfortunately, in all these methods of shockwaves generations in liquids and suspensions the shockwaves are generated in small focus areas, which leads to uneven application of shockwave energy through the volume of processed liquid media. Shockwaves in liquids can be generated by solid or liquid explosives, however use of explosives leads to very uneven exposure of the liquid to the shockwaves effects and are difficult to implement in industrial setting because of the hazard related to use of solid or liquid explosives. Also for industrial processing shockwave generation method need be very repeatable and able to generate high intensity shockwaves at relatively small time intervals that is difficult to achieve using explosives. Thus it is not efficient or practical to use these methods for shockwaves generation for processing liquids, colloids, gels, pastes and liquid suspension in industrial applications. The present invention contemplates elimination of the drawbacks associated with attempted apparatus and methods for generating shockwaves in liquids, colloids, gels, pastes and liquid based suspensions.

It is therefore an object of the present invention to provide a method and apparatus for efficient and scalable generation of shockwaves that can be repeated at small time intervals and that have a wide range of shockwaves pressure amplitudes and positive pressure phase durations that will be used in various processing systems that will utilize shockwaves for food pasteurization and sterilization, pharmaceutical processing, genetic engineering, organic material extraction, suspension homogenization, milling of solid material and other applications.

BRIEF SUMMARY OF THE INVENTION

The present invention is an improved method and apparatus for generating shockwaves in liquids, liquid based suspensions, pastes, gels and materials that can be immersed in liquids and liquid based suspensions. These and other objects of the present invention are achieved by providing a method and apparatus for shockwaves generation that includes the steps of injection of unprocessed liquid into shockwaves processing section, injection of detonable reactive mixture in the shockwaves generation section, generating high pressure shockwaves in a shockwaves generation section of the apparatus through the rapid reaction of reactive mixtures, transmitting these shockwaves through a solid or liquid interface or directly into media in the shockwaves processing section, and injection of pressurizing gas in shockwave generation section. Injection of pressurizing gas, which is typically non-reacting gas such as air or nitrogen, is critical and essential because it will induce purging of the high temperature reaction products and cooling of the internal volume of the shockwaves generation chamber allowing to avoid self-ignition of the next charge of the detonable mixture and thus enabling generation of repeatable shockwaves at intervals less than 30 minutes and usually less than 1 minute. Injection of pressurizing gas is also critical and essential because it will prevent rapid pressure drop in the shockwave generation section, which can cause splash back of processed liquid from the shockwaves processing section to the shockwaves generation section. The apparatus is capable in generating shockwaves or high pressure acoustic waves in the shockwaves processing section with peak pressure values between 0.1 MPa (Mega Pascal) to 2000 MPa and positive phase duration of 10 nanosecond to 10 milliseconds which as a function of shockwaves parameters will kill all or a large number of microorganisms, cause biological cells lysis, increase biological cells permeability to chemical and biological agents, lead to homogenization and milling of solid particles included in liquid, promote chemical reactions, trigger polymerization and cause other known mechanical, biological and chemical effects that are caused by shockwaves or high pressure acoustic waves of various intensity and duration.

Pressurization gas is injected in the shockwaves generation section continuously or intermittently and the detonable mixture is injected in the shockwaves generation section intermittently. Ignition of the detonable mixture leads to generation of shockwaves in this mixture that transmits into liquid in the shockwaves processing section. Reaction products and pressurization gas can be discharged through a single or multiple pressure relief valves, or other pressure relief devices such as small orifices, into the atmosphere directly or through a filter, reaction products collection tank or directly into liquid in the shockwaves processing chamber. At the same time, continuously or with a delay the material contained in the shockwaves processing section will be partially or fully replaced with the new unprocessed material and the process can be repeated starting with injection of reactive gases into shockwaves generation chamber, generation of shockwaves in the processing chamber and injection of pressurizing gas and purge of the detonation products. Use of pressurizing gas allow consistent pressurization of the shockwaves generation section to pressures greater of equal to the pressure of liquid in processing chamber which will reduce the load on the interface separating gas and liquid, enable use of floating or moving interface with low impedance characteristics or, in case when these sections are not separated by an interface material, will eliminate or reduce splash back of liquid from the processing chamber into shockwaves generation chamber. In case when the shockwaves generation chamber sealed by an impermeable membrane containing the shockwaves generation chamber gas pressure, it will be advantageous to keep pressure in the processing chamber above the initial pressure in the shockwaves generation chamber thus reducing the load on the membrane at the shockwave generation stage of the cycle. Pressurizing gas is usually air, nitrogen, oxygen or any other gas or mixture of gases that can prevent self-ignition of the detonable or reactive mixture injected into the shockwaves generations chamber.

Use of pressurization gas in the present invention is critical because it facilitates effective purging of reacted gas from the shockwaves generation chamber, prevents self-ignition of the injected detonable mixture, facilitates cooling of internal volume of the shockwaves generation chamber, helps removing water or other liquids from the area of igniter which can disrupt ignition, reduces or prevent splash back from processing chamber into shockwaves generation chamber. It also allows effective control of desired average pressure in the system which reduce the load on system elements. These beneficial effects of pressurization gas injection are critical for effective industrial implementation of the present invention at wide range of scales of processing apparatuses that can operate at range of processing cycle frequencies.

In one embodiment the shockwaves processing apparatus comprises a process control module, a shockwaves generation chamber, valves or other means for controlled injection of fuel, oxidizer and pressurization gas, an igniter, an interface between the volumes of shockwaves generation and processing chambers made of materials with low impedance characteristics such as silicone based polymer, polyethylene, styrene, carbon composite, aluminum or thin high strength material such as Inconel and contains gas pressure in the shockwaves generation chamber, a shockwaves processing chamber with valves controlled inlet and outlet allowing continuous or intermittent injection of material to be subjected to shockwaves generated in the shockwaves generation chamber. The volume of the shockwaves generation chamber may range from 0.1 cm$^3$ to 100 m$^3$, but usually from 1 cm$^3$ to 1 m$^3$ and the volume of the processing chamber may range from 0.1 cm$^3$ to 100 m$^3$, but usually from 1 cm$^3$ to 1 m$^3$ Without limitation both shockwaves generation and processing chambers can have cylindrical, conical, spherical, prismatic or other geometries for their external forms and internal volumes. In one embodiment both shockwave generation and processing chambers have cylindrical geometry with internal diameter from 0.01 cm to 5 m but usually from 0.1 cm to 50 cm. Such a wide range of scales of implementation is critical for various scientific and industrial applications that include generation and utilization of shockwaves is enabled by the current invention. Use of pressurizing gas will enable generation of shockwaves in a single shockwaves generation chamber at time intervals of 1 millisecond to 30 minutes, but usually at time intervals of 10 milliseconds to 10 minutes allowing consistent generation of shockwaves in processed liquids and exposing processed liquids to single or multiple shockwaves as required for processing.

In another embodiment, the shockwaves processing apparatus comprises a process control module, shockwaves generation chamber, valves or other means for controlled injection of fuel, oxidizer and pressurization gas, an igniter, a pressure relief valve, a shockwaves processing chamber with valve controlled inlet and outlet allowing continuous or intermittent injection of material to be subjected to shockwaves generated in the shockwaves generation chamber. A part or all the shockwave generation section is immersed and contained in liquid, liquid suspension or other media contained in the shockwaves processing chamber. In this embodiment shockwaves are transmitted from the shockwaves generation chamber into processing chamber through the walls of the shockwaves generation chamber. For efficient transmission of shockwave energy, the sections of the walls of the shockwaves generation chamber that are immersed into processed liquid or suspension are made from low impedance materials such as plastics, aluminum alloys, carbon composites or thin high strength and high impedance materials such as steel, Inconel. To contain energy of the shockwaves and to facilitate additional reflections, that will add to processing, the walls of the processing chamber are made from high impendence materials such as thick walled steel, tungsten carbon cermet, tungsten based alloys and similar materials. In cases where liquid processing requires uniform exposure to shockwaves, the external walls of shockwaves processing chamber will be made from low impedance materials such as carbon based composite, aluminum alloys and other materials that will prevent reflections of the incident shockwaves.

To generate high pressure shockwaves in the shockwaves processing chamber, the shockwaves generation chamber is filled with the detonable mixture of reactants with an average material density greater than 1 kg/m$^3$ and smaller than 3000 kg/m$^3$. After detonation, the shockwaves are transmitted through the walls of the shockwaves generation chamber, through the interface between the internal volumes of shockwave generation and processing chambers or directly to the media in the processing chamber and will have a peak pressure of 1 MPa to 2000 MPa and a positive phase duration of 10 nanoseconds to 10 milliseconds. Depending on peak pressure and shockwave impulse these shockwaves will kill all or a large number of microorganisms, cause cells lysis, promote chemical reaction or cause other chemical, physical or biological effects that are know to be caused by shockwaves or high intensity acoustic waves and are critical for various scientific, industrial and medical applications. Such a wide range of pressures and positive phase durations can be achieved by injecting a suitable detonable mixture into the shockwaves generation section of appropriate size of the shockwaves generation apparatus that is designed to contain detonation products during and after detonation. After each detonation the shockwaves generation chamber is filled with pressurizing gas at pressure of 0.1 MPa to 100 MPa which will expel high temperature detonation products and will ready shockwaves generation chamber for the next fill with the detonable mixture. Injecting the shockwaves generation chamber with pressurizing gas assures repeatable generation of detonation waves at 0.001 Hz to 1000 Hz shockwaves generation frequencies.

In another embodiment, the shockwave generation apparatus comprises two or more shockwaves generation chambers that are placed within a processing chamber filled with liquid, liquid suspension or other materials that are subject to shockwaves processing. In this embodiment, a pressurizations gas and a detonable mixture are injected simultaneously or with a time delay into the multiple shockwaves generation chambers where reactions are initiated simultaneously or with a time delay. Multiple shockwaves generation chambers create multiple shockwaves or acoustic waves that propagate into media contained in the processing chamber. Interaction of multiple shockwaves emitted by multiple source create flow field that will subject the processed media to intense sheer force which will be critical for material homogenization, killing microorganisms, cell lysis, milling and other application. In the multi chamber embodiment of this invention use of pressurizing gas is critical because it allows repeatable and well-timed generation of shockwaves that may interact when propagating through the processed media.

In another embodiment, to facilitate effective ignition of the detonation waves in the shockwaves generation section, the shockwaves processing apparatus comprises a process control module, a gas mixing chamber, an ignition chamber, a shockwaves generation chamber, valves or other means for controlled injection of fuel, oxidizer and pressurization gas, an igniter and a shockwaves processing chamber with valves controlled inlet and outlet allowing continuous or intermittent injection of material to be subjected to shockwaves generated in the shockwaves generation chamber.

The steps of the shockwaves generation, shockwaves transmission directly or through interface into processing chamber and detonation products discharge can be applied in the shockwaves processing apparatus once or multiple times depending on a variety of factors including safety requirements, the type of process to be performed and other factors, however repeatable application at one or multiple shockwaves generation frequencies will be more characteristic for industrial applications.

BRIEF DESCRIPTION OF THE DRAWINGS

The present invention will now be described in more detail with reference to preferred embodiments of the invention, given only by way of example, and illustrated in the accompanying drawings in which.

DETAILED DESCRIPTION OF THE INVENTION

Figure 1:
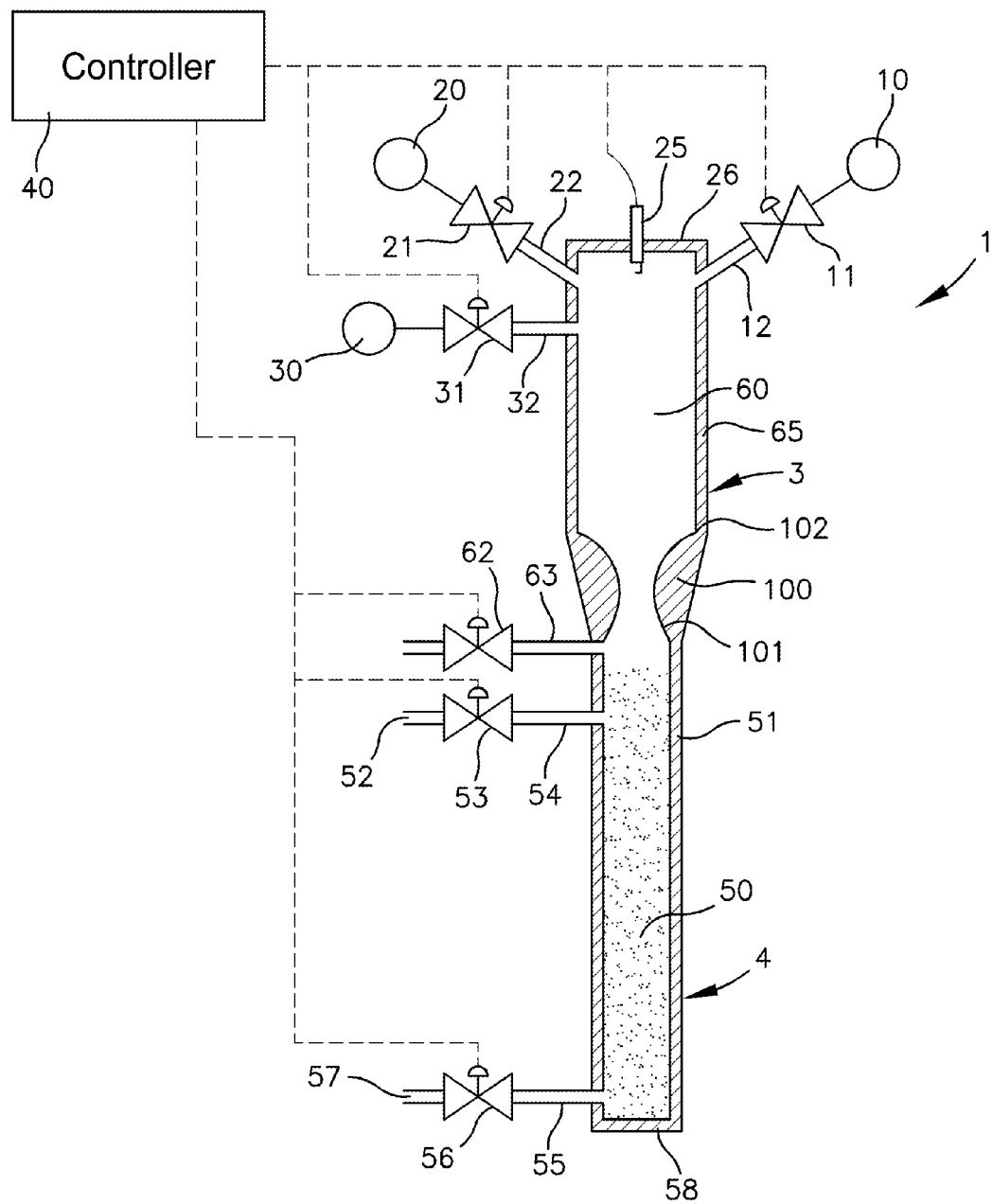
FIG. 1 is a schematic, cross-sectional illustration of a shockwaves processing apparatus with shockwaves generation and shockwaves processing sections connected through a converging/diverging nozzle.

In addition to their ordinary meaning, the terms set forth below and as used herein may be defined as follows:

"Shockwaves generation section" is the section of the shockwaves processing apparatus where shockwaves are generated including as a result of chemical reaction. It includes a shockwaves generation chamber, a reactives mixing chamber, an ignition chamber, valves, ignition and other system elements necessary for shockwaves generation and control of this section operation.

"Shockwaves processing section" or "processing section" is the section of the apparatus to which the shockwaves generated in the shockwaves generation section are transmitted and which facilitate their propagation and utilization in physical, chemical, biological and mechanical processes. It includes a shockwaves processing chamber, valves and all other systems necessary for control of this section operation.

"Shockwave", "shockwaves", "shock" or "pressure wave" when used in relation to processes in the shockwaves generation section of the apparatus all describe gas dynamic shockwaves or waves created by reaction of a detonable mixture that propagates with supersonic speed.

"Shockwave", "shockwaves", "pressure wave", "shock" or "wave" when used in relation to processes in the shockwaves processing section of the apparatus all describe hydrodynamic shockwaves or acoustic waves that propagate with sonic or supersonic speed in liquid, liquid suspension, colloid, gel, paste or solid media.

"Detonation" or "detonation process" are similar terms and are used herein to describe a physical and chemical phenomena characterized by a rapid chemical reaction that leads to the creation of a shockwave, shockwaves or pressure waves. When used in relation to the process within the shockwaves generation section, of the apparatus these terms are used to describe a reactive process that generates a shockwave, shockwaves or pressure waves. It is understood that, as a function of chemical composition, quantities, initial pressure and temperature, different types of physico-chemical processes including deflagration, detonation, and transition from deflagration to detonation, rapid decomposition and combination thereof will lead to rapid pressurization of the shockwaves generation section and generation of shockwaves or pressure waves.

"Detonable mixture" as used herein, refers to single or multiple reactants that can undergo rapid chemical reactions including detonation, deflagration, rapid decomposition or combination thereof creating a shockwave or pressure wave. One example of a detonable mixture is the mixture of oxygen, hydrogen and nitrogen gases. Another example of a detonable mixture is a monopropellant such as nitrobenzene or nitroglycerin. Another example of a detonable mixture is high concentration hydrogen peroxide that can undergo explosive decomposition after injection into the shockwaves generation section of the apparatus. Selection of a suitable fuel and oxidizer or a single reactant to form the detonable mixture will be apparent to persons skilled in the art. Non-limiting examples of fuel reactants that can be used to form a detonable mixture include kerosene, gasoline, methane, natural gas, hydrogen, acetylene, and propylene. Non-limiting examples of oxidizer reactants that can be used to form the detonable mixture include oxygen, air, a mixture of oxygen and air, a mixture of oxygen and one or more inert gases such as nitrogen, argon or helium, hydrogen peroxide.

"Pressurizing gas" as used herein, refers to gas that is used to pressurize the shockwaves generation chamber after detonation or other reaction of detonable mixture that is generating shockwaves. One example of pressurizing gas is air. Another examples of pressurizing gas are nitrogen, oxygen, carbon dioxide, argon, mixture of air, nitrogen and water.

"Shockwaves transmitting media", as used herein, refers to liquid, solid elastomers, colloids, gels, solid composite materials and other forms of material that can transmit hydrodynamic shock or acoustic waves. The examples of a shockwaves transmitting media are elastomer such as Aqualene, low density polyethylene, silicone rubber or solid plastic such as polystyrene, metals such as aluminum that have low acoustic attenuation coefficients.

"Processed liquid" or "Unprocessed liquid" as used herein, refers to liquids, colloids, suspensions, gels or pastes that may or may not include solid particles and/or gas bubbles or other components that can flow through the processing chamber in order to be processed by exposure to shockwaves or high amplitude acoustic waves that are generated in the shockwaves generation chamber.

"Impedance" means "acoustic impedance" that can be calculated by multiplying density and sound speed of the media.

"Membrane" is a part of the shockwaves generation section of the apparatus that transmits shockwaves or acoustic waves from the shockwaves generation section into the shockwaves processing section of the apparatus.

"Interface" is a part of the shockwaves processing section of the apparatus that is placed between the mostly gas in the shockwaves generation chamber and mostly liquid in the processing chamber and transmits shockwaves or acoustic waves from the shockwaves generation chamber to the shockwaves processing chamber. In difference with a "membrane" the "interface" is not attached to the walls of either detonation or processing chambers and can float or move with the liquid in the processing chamber.

Referring now to the invention in more detail, FIG. 1 schematically illustrates a first embodiment of a shockwaves processing apparatus 1. The shockwaves processing apparatus 1, is configured for the repetitive generation of shockwaves to be transmitted into a shockwaves processing section for the shockwaves processing of media located in this section.

The shockwaves processing apparatus 1 includes a shockwaves generation section 3 in which shockwaves are generated and a shockwaves processing section 4 in which shockwaves are processing the media situated in this section. The shockwaves generation section 3 generally comprises a pressure vessel having a vessel wall 65 surrounding a shockwaves generation chamber 60. A pressurizing gas is injected into the shockwaves generation chamber 60 and a connecting nozzle 100 through a pressurization gas feed line 32 extending from a pressurization gas storage tank 30 through gas control valve 31. An oxidizer is injected into the shockwaves generation chamber 60 through an oxidizer feed line 12 extending from an oxidizer storage tank 10. An oxidizer control valve 11 mounted on feed line 12 controls the flow of oxidizer into the shockwaves generation chamber 60. Fuel is injected into the shockwaves generation chamber through fuel feed line 22 extending from fuel storage tank 20 through fuel control valve 21. In the embodiment shown, the pressurization gas feed line 32, the oxidizer feed line 12, and fuel feed line 22 extend through the vessel wall 65 near a closed endwall 26 of the shockwave generation section 3.

A spark plug 25 is mounted in the vessel wall 65 and extends into the shockwaves generation chamber 60 near the inlets for the oxidizer feed line 12 and the fuel feed line 22. A pressure relief valve 62 is mounted on an exhaust line 63 extending through the wall 51 of the shockwave processing section 4. In the embodiment shown, the exhaust line 63 is located below the connecting nozzle 100 and above the level of liquid in the processing chamber 50. A nozzle 100 is connecting between the volumes of the shockwaves generation chamber 60 and the processing chamber 50.

The shockwaves processing section 4 generally comprises a vessel wall 51 surrounding a processing chamber 50. The processing chamber is connected to the shockwaves generation chamber through the connecting nozzle 100. A raw unprocessed liquid or liquid suspension is injected from the inlet 52 through an inflow control valve 53 and inflow line 54 into the processing chamber 50. The processed liquid or suspension is exiting the processing chamber through the outflow line 55 connected to the control valve 56 and leaving the shockwaves processing section 4 via the outlet line 57. In the embodiment shown, the unprocessed liquid inflow line 54 is located near the top and the processed liquid outflow line 55 at the bottom of the processing chamber 50.

A controller 40 is connected trough electrical wires or wirelessly to control valves 11, 21, 31, 62, 53, 56 and spark plug 25 and is programmed to control the operation of these components. In addition, controller can be connected to pressure, liquid level, and temperature sensors monitoring physical conditions of the processed media at different locations of the shockwaves processing apparatus. These sensors are not shown in the FIG. 1.

An example of the shockwaves processing apparatus 1 shown schematically in FIG. 1 may have a cylindrically shaped shockwaves generation chamber 60 from the spark plug 25 to the connecting proximal end 102 of the converging diverging nozzle 100 with a cylindrically shaped processing chamber 50 from the diverging end of the connecting nozzle 101 to distal end 58 of the shockwaves processing chamber 50. As an example the inner diameter of the shockwaves generation chamber 60 may be 4 cm extending from the endwall 26 to the converging section 102 of the connecting nozzle 100 with an internal height or length of 32 cm resulting in a volume of the shockwaves generation chamber 60 of approximately 400 cm$^3$.

The shockwaves processing section 4 has a cylindrical processing chamber 50 that may have inner diameter 2.5 cm and extends from the end of the connecting nozzle 100 diverging section 101 to the distal end 58 of the processing chamber 50. An internal height or length of the shockwaves processing chamber 50 may be 155 cm resulting the internal volume of the processing chamber 50 of approximately 760 cm$^3$.

The connecting nozzle 100 may have semi conical shape with 10 cm approximate length and converge from 4 cm diameter in the shockwaves generation chamber 60 to 1.5 cm diameter in it smaller cross section and then diverge to 2.5 cm diameter in the processing chamber 50.

The wall 65 of the shockwaves generation chamber 60 may be made from temperature resistant high impedance material for example 1 cm thick high strength steel. To lower losses of shockwave energy, the wall 65 forming the shockwaves generation chamber 60 may be made of a high acoustic impedance material such as tungsten-carbide-cobalt cermet with 5 mm thick wall. Other examples of high strength material with high temperature resistance and high acoustics impedance that can be used in construction of the shockwaves generation section 3 including the connecting nozzle 100 include aluminum oxide, tungsten, Inconel and tantalum. The wall 51 of the shockwaves processing section 4 may be made from high strength and high acoustic impedance materials for example 1 cm thick high strength steel. Other examples of high strength, high acoustic impedance materials that may be used for construction of the shockwaves processing section 4 include Inconel, aluminum oxide, tungsten-carbide-cobalt cermet and other similar metals, cermets, and ceramic materials.

Standard methods can be suitably selected by persons skilled in the art with the aid of no more than routine experimentation to select materials that will contain high pressure, high temperature reaction products that will intermittently interact with the walls of the shockwaves generation chamber 65 and high pressure shockwaves that will impact the wall of the processing chamber 51. Also a combination of materials can be used to lower the cost, lower total weight or improve processing performance. For example, high strength carbon fiber composite material with a steel or other metals liner can be used for construction of the shockwaves generation and shockwaves processing chambers.

To prevent overheating of the shockwaves processing apparatus 1 as a result of heat generated by chemical reactions in the shockwaves generation process standard methods can be suitably selected by persons skilled in the art with the aid of no more than routine experimentation for cooling shockwaves generation chamber 60, nozzle 100, valves, gas and liquid lines and other sections for the apparatus 1. These methods can include passive cooling by increasing external surface area of walls 65 and 51, cooling using water or other cooling agent circulation, and cooling using flow of air or other gases. Standard methods can be suitably selected by persons skilled in the art with the aid of no more than routine experimentation to control temperatures of shockwaves generation and shockwaves processing sections. Control of temperature may include heating or cooling the shockwaves generation and shockwaves processing sections and their elements to achieve optimal performance characteristics.

Operation of the shockwaves processing apparatus 1 schematically shown in FIG. 1 starts with injection of raw unprocessed liquid or suspension from the inlet 52 through valve 53 and inflow line 54 into the processing chamber 50. The outflow valve 56 remains closed allowing fill of the processing chamber 50 with unprocessed liquid. As a function of required processing parameters injected unprocessed liquids can be cooled or heated to achieve optimal processing conditions or to enhance effectiveness of the shockwaves processing. As an example increase or decrease of the unprocessed liquids temperature is known to enhance bactericidal effect of shockwaves. When the shockwaves processing chamber is filled to required level which may be indicated by a standard level sensor or assessed by the fill time for the know inflow rate, the valve 53 is closed and the pressurizing gas valve 31 is opened leading to pressurization of the shockwaves generation and processing chambers to required processing pressure. The magnitude of the processing pressure is determined by the pressure and injection rate of the pressurizing gas that is injected from the pressurizing gas tank 30 through the valve 31 and the gas line 32. The processing pressure is also a function of opening time of valve 32, which is controlled by the controller 40, and the volume of the shockwaves generation chamber 60. The pressure relief valve 62 is set to open when pressure in the shockwaves generation chamber exceeds a certain set level allowing to maintain constant level of pressure for gas and liquid located in the internal volume of the shockwaves generation chamber 60 and the processing chamber 50. When chosen pressure is reached in the shockwaves generation chamber 60 the pressurization valve 31 may be closed and fuel and oxidizer are injected into the shockwaves generation chamber 60 displacing the pressurization gas that will flow out through valve 62. In some instances, as a function of the desired condition and the pressurization gas composition, valve 31 may remain fully or partially open when fuel and/or oxidizer are injected. Injection of non-reactive pressurizing gas at the start of the shockwave processing cycle also assures that all or most of high temperature products of reaction in previous cycle are purged from the shockwaves generation chamber which prevent self ignition of the detonative mixture. This is one of the most critical function of the pressurizing gas injection that enables repeating the shockwaves generation cycle at small time intervals. Because self ignition of newly injected detonable mixture that comes in contact with partially exhausted from the previous cycle detonation products. Self-ignition of newly injected mixture will prevent effective fill of the shockwaves generation chamber with detonable mixture and will not allow effective generation of the detonation waves and high peak pressure shockwaves. Because for most hydrocarbon/oxygen mixtures self-ignition of reactive mixtures occurs at −450° C. and characteristic temperature of the detonation product after detonation is on the order of 3000° C., if detonation products would be just purged and pressurizing gas would not be injected to prevent self-ignition one should wait a prolong time for the reactive products gas to cool before injecting next charge of the detonable mixture. This delay will severely limit frequency of shockwaves generation in a single shockwaves generation chamber. Filling the shockwaves generation chamber with the pressurizing gas assures repeatable generation of detonation waves at 0.001 Hz to 1000 Hz wave generation frequencies.

The fuel and oxidizer are selected so that the mixture is detonable and their injection through the control valves 11 and 21, respectively, is metered by the controller 40 so that the resulting detonable mixture inside the shockwaves generation chamber 60, upon detonation, will form a shockwave of sufficient intensity that when transmitted through the connection nozzle it impacts the surface of liquid in processing chamber 50 and generates shockwave or high intensity acoustic wave in liquid resulting in a selected processing effect. Such effect may include killing microorganisms for liquid pasteurization or sterilization, lysis of cells that are suspended in liquid for pharmaceutical processing, initiation of chemical reaction, promotion of nucleation for chemical processing, deagglomeration of particles in particle/liquid suspension, homogenization of suspension, material milling or processing for other known effect caused by high intensity shockwaves or acoustic waves in liquids or suspensions. As a function of required processing parameters oxidizer, fuel or both can be cooled or heated before injection into shockwaves generation chamber. Generally preheating detonable mixtures will reduce energy required for its ignition and increase detonation shockwave pressure, when cooling will reduce probability of self-ignition. If a monopropellant is used for the shockwaves generation its heating or cooling before injection into shockwaves generation chamber can be used for optimization of the device performance characteristics.

Injection of the pressurization gas through the valve 31 is critical and essential because it facilitates effective purging of reacted gases from the shockwaves generation chamber through the valve 62, prevents self-ignition of the detonable mixture by separating hot reacted products from previous cycle from the newly injected detonable mixture, facilitates cooling of internal volume of the shockwaves generation chamber, helps removing water or other liquids from the area of the igniter which can disrupt ignition and reduces or prevent splash back from the processing chamber 50 into shockwaves generation chamber 60. Pressurization gas may be for example compressed air. In this case use of the pressurization gas will also lower cost of operation because oxidizer or fuel that are usually higher cost, will not be wasted for purging of the reacted gas products or cooling. As a function of process requirements the pressurization gas can be heated or cooled before injection into the shockwaves generation section. Pressurization and rapid cooling of the shockwaves generation section can be also achieved by injection of liquids into high temperature environment of the shockwaves generation chamber. For example, and without limitation 2,3-dihydrodecfluoropentane that will rapidly evaporate when injected into high temperature environment of the shockwaves generation chamber can be used for this chamber pressurization. Pressurization and cooling of the shockwaves generation chamber will be also achieved by injecting multi-phase mixture of liquid/gas or liquid/solid/gas media which will convert fully or partially to gas when injected into shockwaves generation chamber. Injection of the pressurization gas also allows effective control of desired average pressure in the system, which reduces the load on system elements as a result of reduction of pressure fluctuation. Pressurization may be also implemented using other gases such as oxygen, nitrogen or argon that when injected into detonation can quench chemical reaction and cool internal volume of the shockwaves generation chamber.

The leading shockwave transmitted through the connection nozzle will partially transmit into the liquid and partially reflect from the liquid surface back into the nozzle 100 and shockwaves generation chamber 60. The reflected portion of the shockwave will then reflect back from the walls of the shockwaves generation chamber 60 and the endwall 26 and will impact the surface of the liquid generating additional shockwaves and acoustic waves in the liquid and creating additional processing effects. Efficiency of these multiple reflections is a function of materials that are used for construction of the shockwaves generation and processing chambers, where material with high impedance such as tungsten, tungsten carbide, tantalum, Inconel and similar will lead to more efficient reflections and generation of multiple secondary shockwaves and materials with lower impendence such as aluminum, carbon composite, nylon and similar will generate less efficient reflections and reduce the number of the secondary shockwaves. Standard methods can be suitably selected by persons skilled in the art with the aid of no more than routine experimentation for design of the inner walls surfaces of the shockwaves generation and processing chambers that will either increase or decrease the number of the secondary waves and affect the leading shockwaves structure that may be required for specific processing needs. For example, a large number of reflected waves may be required to create sheer for milling or cells lysis and uniform single shockwave may be required to promote uniform nucleation or to kill specific micro organisms.

The shockwaves transmitted into the processing chamber 50 propagate through the liquid or suspension situated in this chamber. The shockwaves attenuation in liquid is a function of physical properties of liquid or liquid suspension situated in the processing chamber 50. Water has lower acoustic attenuation coefficient compared to some suspensions and food pastes such as avocado or humus. The shockwave amplitude decay during propagation will be also minimized by forming the walls 65 and 51 and nozzle 100 from materials with high acoustic impedance. The shockwave amplitude will increase in a processing chamber in which the diameter will converge from the end of the diverging section 101 of the nozzle 100 to the distal end 58 of the chamber 50. The angle of convergence can be chosen to compensate for shockwave attenuation in liquid thus leading to propagation of the shockwave with the same strength through entire volume of the processing chamber.

As a result of the detonation of reactive mixture during shockwave generation process the average pressure in the shockwaves generation chamber 60 will increase. When the average pressure in the shockwaves generation chamber reaches a preset value the pressure release valve 62 will open and detonation products will be vented to atmosphere. Due to inertia of the pressure relief valve 62 it will open after the main shockwave is already generated and thus its opening will not interfere with the shockwaves generation process. Due to gas release through the valve 62 pressure in the shockwaves generation chamber 60 will rapidly decrease. Injection of the pressurization gas controlled by the valve 31 will assure that pressure in the shockwaves generation chamber will not fall below a set pressure value, will assist in purging detonation products from the chamber, will assist in cooling internal surfaces and also will assure that any liquid products that may backsplash into the shockwaves generation chamber from the processing chamber will be pushed back. Preventing processed liquid back splash is very important for reliable system operation because this liquid can interfere with the spark plug ignition system as well as deposit material on the inner walls of the shockwaves generation chamber.

For example, the pressure relief valve 62 can be selected to have an opening time as fast as 30 milliseconds when the time of generation, propagation and reflection of the shockwave will be approximately 2 milliseconds which will assure that operation of the purge valve does not interfere with the shockwave generation process. Pressure relief valve may be a mechanical or solenoid valve. Pressure relief can also be facilitated without use of a pressure relief valve by selecting the size of opening 63 or orifice so that during detonation very small amounts of the detonation products will be exhausted thought this opening due to the short duration of the process and small size of the opening and most of the detonation products will be exhausted after the shockwave is transmitted into liquid located in the processing chamber 50. Exhausted gases can be directly release into atmosphere or can be captured, filtered and release into the surrounding atmosphere when not harmful.

After the pressure in the shockwaves generation chamber 60 drops to a preset value, the pressure relief valve 62 closes, sealing the volume of the chamber 60. At this point, the steps of pressurization, injection of the detonable mixture and detonation will be repeated to generate another shockwave. The shockwaves generation steps can be repeated at a frequency selected to obtain the best processing effect for the chosen application. Thus a single charge of the unprocessed material introduced into the shockwaves processing section can be subjected to multiple cycles of shockwaves generation produced by operation of the shockwaves generation section. In fact, the procedure of introducing the pressurizing gas, followed by introducing detonable mixture, causing formation of at least one shockwave and venting detonation products and pressurizing gas is repeated as many times as necessary for achieving a pre-determined degree of processing liquids, liquid suspension, colloids, gels, and pastes located in the shockwaves processing section.

The frequency of shockwaves generation section operation is controlled by the controller 40. Multiple pressure relief openings and valves can be used to facilitate rapid pressure relief and detonation products purge. Filling shockwaves generation chamber with pressurizing gas allows repeatable generation of detonation waves at 0.001 Hz to 1000 Hz wave generation frequencies. As a function of processing needs the liquid or suspension located in the processing chamber 50 can be subjected to a single or multiple shockwave generation cycles. After processing is completed the unprocessed liquid in injected into chamber 50 through valve 53 and processed liquid in ejected through valve 56. Timing of valves 53 and 56 opening and closure is controlled by the controller 40 and can be designed to facilitate required exposure of the processed liquid to the shockwaves. Flow of the unprocessed liquid through the inlet 54 and the outlet 55 can be continuous, when shockwaves generation process is intermittent. In this case the flow rate of the unprocessed liquid will be adjusted to allow required exposure to intermittent shockwaves generated in the shockwaves generation chamber.

The amount of energy transferred and reflected during a single detonation will be a function of the physical parameters or properties of the detonation wave and the liquid in the processing chamber. Parameters of the detonation mixture in chamber 60, nozzle 100 geometry and liquid or suspension located in chamber 50 can be suitably selected by persons skilled in the art in such a way that a large portion of shockwave energy generated in the shockwaves generation section 3 is transmitted into the liquid in the shockwaves processing section 4.

Figure 2:
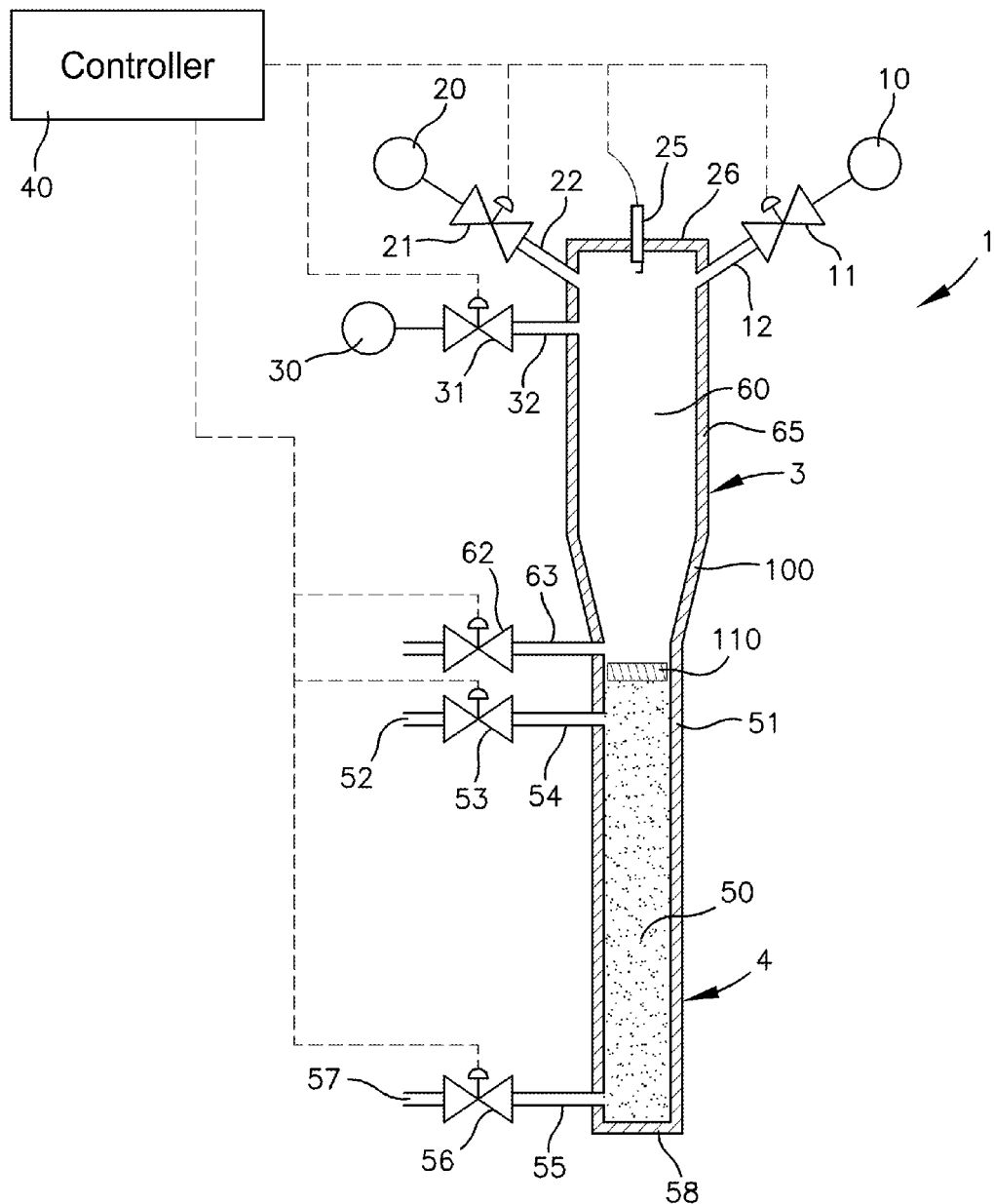
FIG. 2 is a schematic, cross-sectional illustration of a second embodiment of the shockwaves processing apparatus in which media in the shockwaves generation chamber is separated from media in processing chamber by a movable interface material.
Figure 2A:
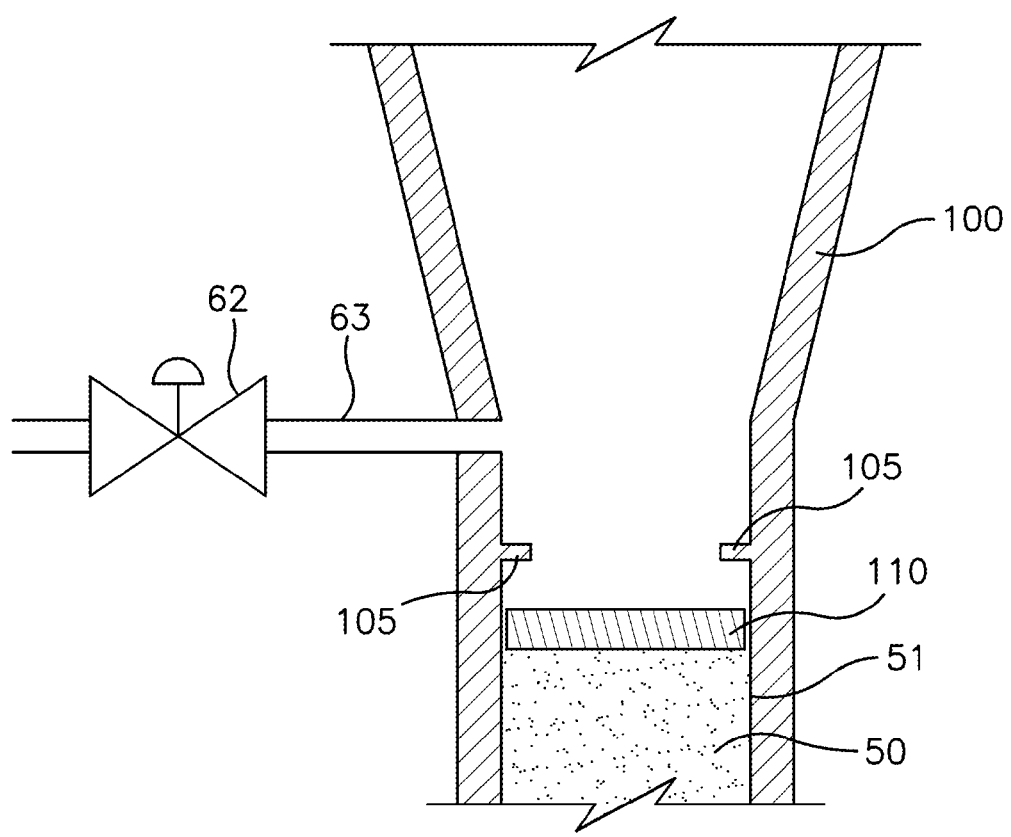
FIG. 2a is a schematic, cross-sectional illustration of a second embodiment of the shockwaves processing apparatus in the area of membrane showing membrane motion limiting ring.
Figure 2B:
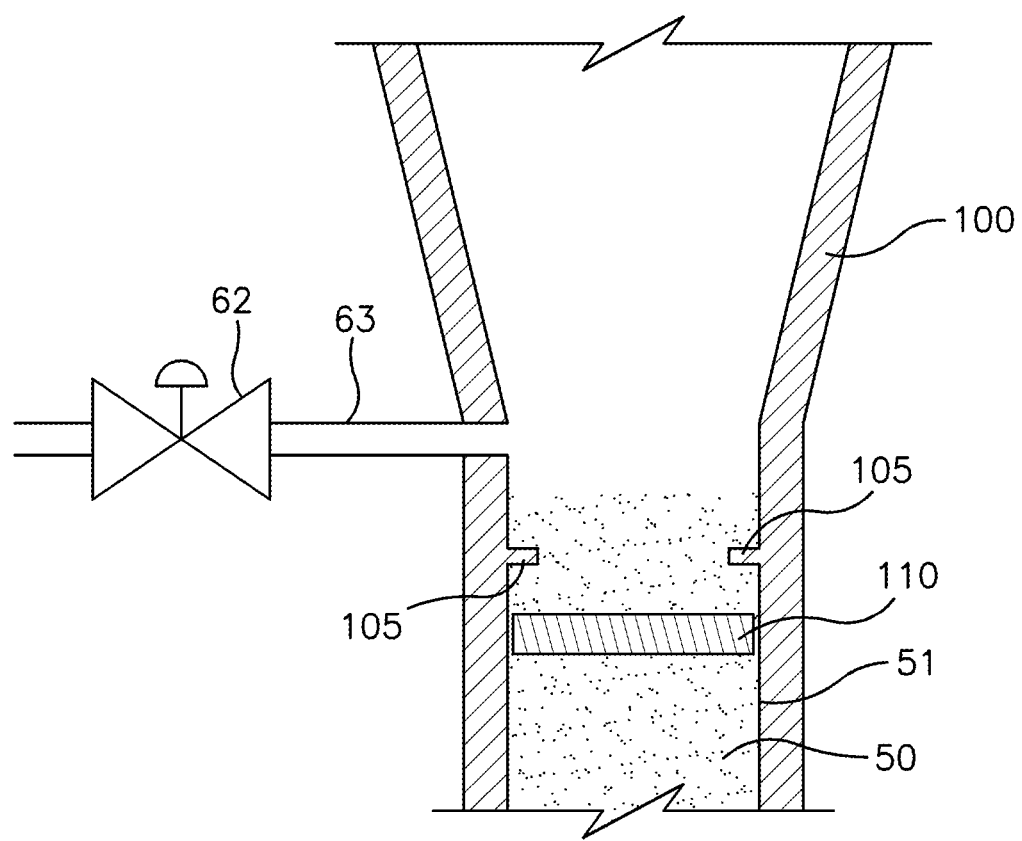
FIG. 2b is a schematic, cross-sectional illustration of a second embodiment of the shockwaves processing apparatus in the area of membrane showing membrane immersed in liquid.

An alternative embodiment of a shockwaves processing apparatus 1 is shown in FIGS. 2, 2a and 2b having a shockwaves generation chamber or vessel 60 that is connected to a processing chamber 50 through a connecting nozzle 100. In describing the embodiment of the shockwaves processing apparatus 1 shown in FIGS. 2, 2a and 2b and the additional embodiments shown in subsequent figures, common elements may be identified by the same reference numbers used in describing the embodiment shown in FIG. 1. In FIG. 2 connecting nozzle 100 is conical and is converging from the diameter of the shockwaves generation chamber 60 to the diameter of the processing chamber 50. Also shown in FIG. 2 a movable low attenuation interface 110 that can be floating on the surface of the liquid in the chamber 50 or suspended in the liquid using known mechanical means.

In FIG. 2a shown a floating interface 110 which movements are limited by a ring 105 that has a smaller diameter than the inner diameter of chamber 50. During operation of shockwaves processing apparatus 1 some liquid from the processing chamber can seep over the interface 110 or the interface can be purposely placed under the surface of the liquid as shown in FIG. 2b. Interface motion limiting ring 105 will be also beneficial in limiting flow of processed liquid into shockwaves generation chamber during unprocessed liquid injection and during detonation and detonation products purge phases of the shockwaves generation cycle. In addition to using the ring 105 limiting upwards motion of the interface 110 can achieved with other mechanical means such as pins placed on the wall 51 or a local reduction of the inner diameter of chamber 50. Placing some liquid over the surface of the interface 110 can be beneficial for protection of the interface from the heat load produced by the detonations. When the density of the interface 110 is lower than the density of the media located in chamber 50 the interface 110 can be place under the ring 105. When the density of the interface 110 is higher than the density of the media located in chamber 50 the interface 110 can be place over the ring 105.

Other methods of protecting the interface 110 can include using low acoustic attenuation heat resistant materials for the interface construction such as carbon, silica or alumina based composite; using a heat resistive thin metal layer placed over the top of the interface that is facing the reactive products in the shockwaves generation chamber 60. One also can place over the interface 110 other liquids or gels such as water, silicone gel, petroleum based grease and similar in order to transmit shockwaves and protect the interface 110 material.

The interface 110 can be designed to seal fully or partially the internal volume 50 when shockwaves generation chamber is pressurized. The interface 110 can be made from materials that allow effective transmission of the shockwaves such as elastomer Aqualene, silicone rubber or solid plastic such as polystyrene that have low acoustic attenuation coefficients. Standard methods can be suitably selected by persons skilled in the art with the aid of no more than routine experimentation to protect elastomer from heat exposure from the detonation products. Metals have usually higher acoustic attenuation coefficient but they have higher strength and thermal stability than plastic or elastomers, thus using metals for construction of interface 110 one would minimize the thickness of the interface.

In the embodiment illustrated schematically in FIGS. 2, 2a and 2b the cylindrical wall 65 of the shockwaves generation chamber 60, conical walls of the nozzle 100 and cylindrical walls of the processing chamber 51 are preferably made from high strength, high thermal resistance and high impedance material such a high strength steel, Inconel, tungsten carbide and similar. An example of the shockwaves processing apparatus 1 shown schematically in FIG. 2 may have a cylindrically shaped shockwaves generation chamber 60 from the endwall 26 to the connecting converging nozzle 100 with a cylindrically shaped processing chamber or vessel 50 from the distal end of the nozzle 100 to the distal endwall 58. The inner diameter of the shockwaves generation chamber 60 may be 40 cm extending from the endwall 26 to the converging nozzle 100 with an internal height or length of 200 cm resulting in a volume of the shockwaves generation chamber 60 of approximately 0.25 m$^3$. The processing chamber 50 may be cylindrical that may have inner diameter 30 cm and extends from the end of the connecting nozzle 100 to the distal end 58 of the processing chamber 50. An internal height or length of the shockwaves processing chamber 50 may be 250 cm resulting the internal volume of the processing chamber 50 of approximately 0.18 m.

The connecting nozzle 100 may have frusta-conical shape, 20 cm approximate length and converge from 40 cm diameter in the shockwaves generation section to 30 cm diameter at the distal end of the nozzle where it connects with the processing chamber 50. Other elements, operation and materials used for construction of the embodiment shown in FIGS. 2, 2a and 2b are the same or similar to these described for the embodiment shown in FIG. 1.

Figure 3:
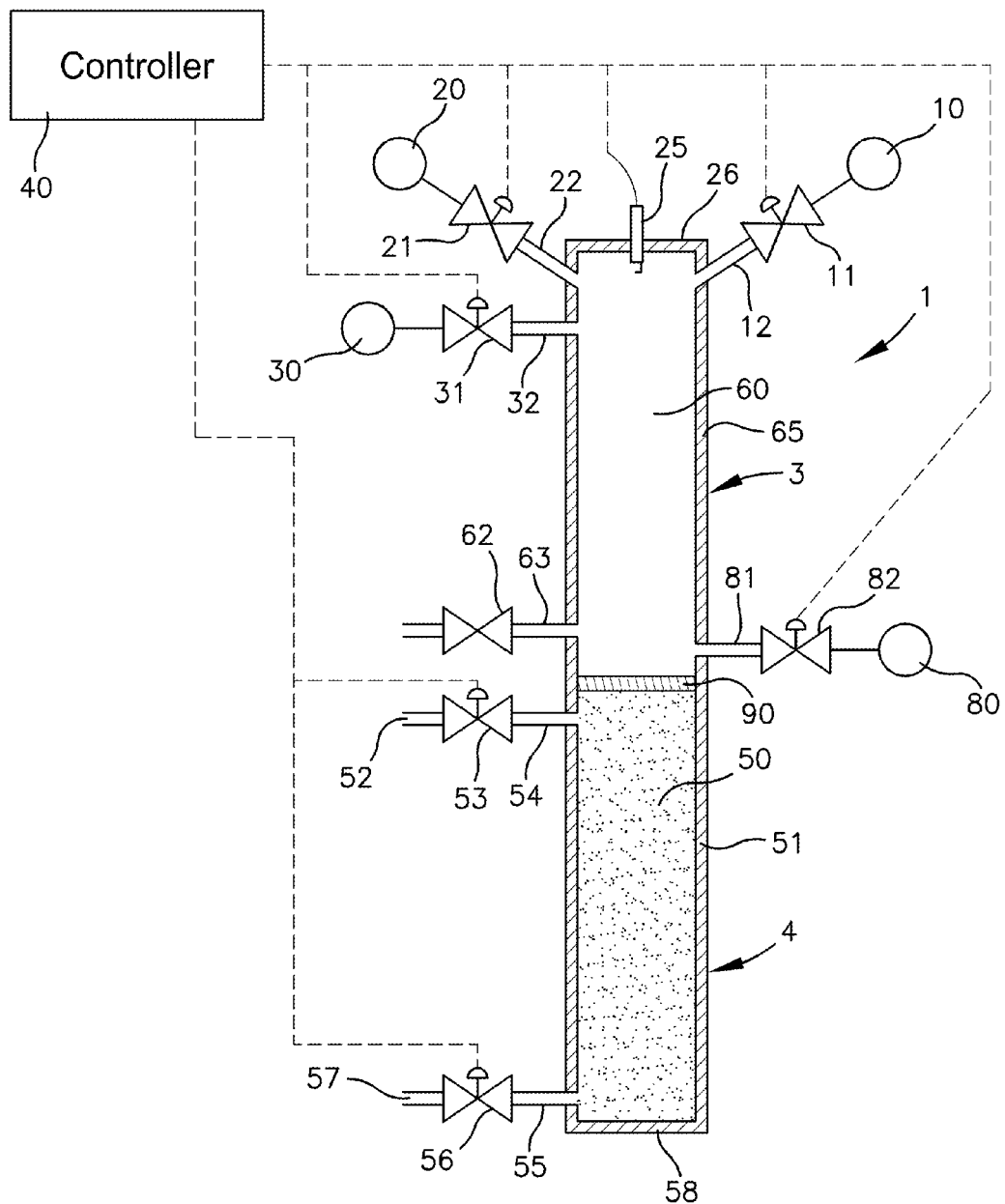
FIG. 3 is a cross-sectional schematic view of a third embodiment of the shockwaves processing apparatus in which shockwaves generation and shockwaves processing sections are separated by a rigid membrane attached to the internal wall of shockwaves processing section.

An alternative embodiment of the shockwaves processing apparatus 1 is shown in FIG. 3. In FIG. 3 the shockwaves generation chamber 60 and the processing chamber 50 are cylindrical with the same inner diameter and the solid membrane 90 is positioned there between the chambers 60 and 50. It is preferable that membrane 90 is made from an elastomer that has low acoustic impendence and low acoustic attenuation parameters. Examples of elastomers that can be used to make the membrane 90 include polyethylene, polyurethane, Nylon or ethyl vinyl acetate that have impedances comparable to the impedance of water. The membrane 90 can be also made from materials that have high impedance and high mechanical strength such as metals, where shockwave transmission efficiency is achieved because in this case material strength will allow making the membrane 90 thin. The membrane 90 is designed to contain the gases in the shockwaves generation chamber 60 and sustain the pressure difference between the chambers 60 and 50 that can develop during apparatus operation. In FIG. 3 shown feed the line 81 and the valve 82 that allow injection of water or other liquid with high heat capacity from liquid the source 80 over the membrane 90. Injection of suitable amount of liquid in the shockwaves generation cycle at the time when pressure is relatively low through the feed line 81 and the valve 82 will create a layer of liquid over the membrane 90 which will not interfere significantly with the shockwave transmission through the membrane and protect the membrane 90 from exposure to high temperature reactive products in the chamber 60. Standard methods can be used to design the membrane 90 so that it will seal the gases in the shockwaves generation chamber 60 and sustain the pressure difference between the chambers 60 and 50, be impermeable to gas in the chamber 60 and cooling liquid injected through the valve 82. Other methods for protection of the membrane 90 from heat of reaction products can include coating the surface of the membrane 90 with a layer of heat resistive materials, timing the shockwaves generation cycle to allow cooling of the membrane between the cycles and other standard methods that can be suitably selected by persons skilled in the art with the aid of no more than routine experimentation.

Figure 4:
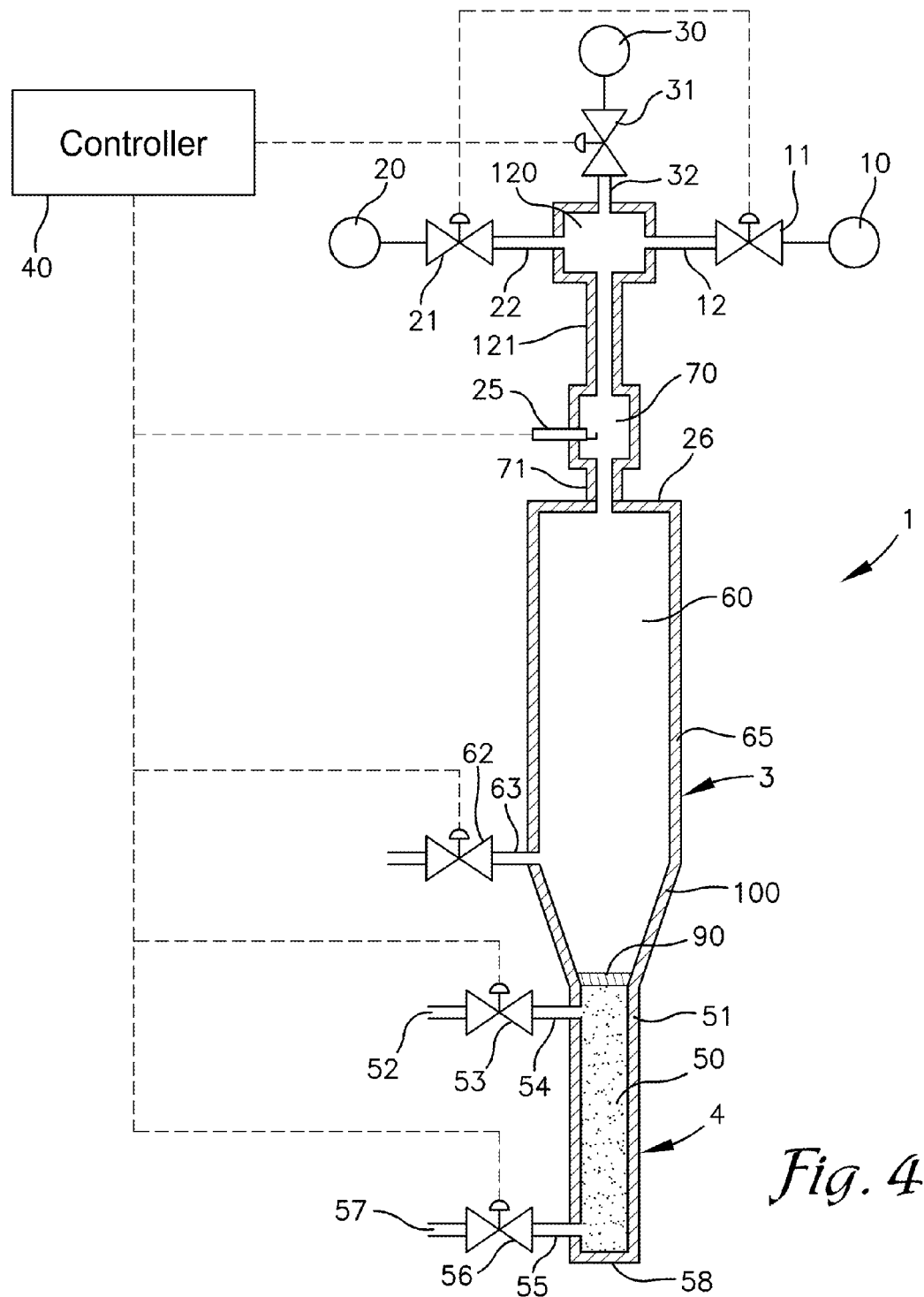
FIG. 4 is a cross-sectional schematic view of a fourth embodiment of the shockwaves processing apparatus in which reactive gases are mixed in a mixing chamber and ignited in an ignition chamber.

An alternative embodiment of the shockwaves processing apparatus is shown in FIG. 4. In FIG. 4 a pressurization gas is injected through a pressurization gas feed line 32 extending from a pressurization gas storage tank 30 through a gas control valve 31 into mixing a chamber 120 connected through a tube 121 to an ignition chamber 70 which is connected through a tube 71 with a shockwaves generation chamber 60 and a converging nozzle 100. An oxidizer is injected through an oxidizer feed line 12 extending from an oxidizer storage tank 10 into the mixing chamber 120 connected through the tube 121 to the ignition chamber 70 which is connected through the tube 71 with the shockwaves generation chamber 60. An oxidizer control valve 11 mounted on feed the line 12 controls the flow of the oxidizer into the shockwaves generation chamber 60. Fuel is injected through a fuel line 22 extending from a fuel storage tank 20 through a fuel control valve 21 into mixing the chamber 120 connected through the tube 121 to the ignition chamber 70 which is connected through the tube 71 with the shockwaves generation chamber 60. In the embodiment shown controlled, simultaneous injection of the oxidizer and the fuel into the mixing chamber 120 will promote mixing of these reactive components creating a detonable mixture that will flow through the tube 121 into the ignition chamber 70 and further through the tube 71 into the shockwaves generation chamber 60. Design of the mixing chamber that assures effective mixing of fuels and oxidizers can be suitably selected by persons skilled in the art with the aid of no more than routine experimentation. Other elements, operation and materials used for construction of the embodiment shown in FIG. 4, are the same or similar to these described for the embodiment shown in FIG. 3.

A critical benefit of the embodiment shown in FIG. 4 is that use of mixing chamber 120 assures that ignition chamber will be filled with well mixed detonable mixture which when ignited by the spark plug 25 will create a reaction wave that will rapidly transit into the detonation wave efficiently initiating detonation in the shockwaves generation chamber 60. Also injection of the pressurization gas into the mixing and ignition chambers assures cooling and cleaning these chambers after the detonations which prevents self-ignition and improves spark discharge reliability.

Figure 5:
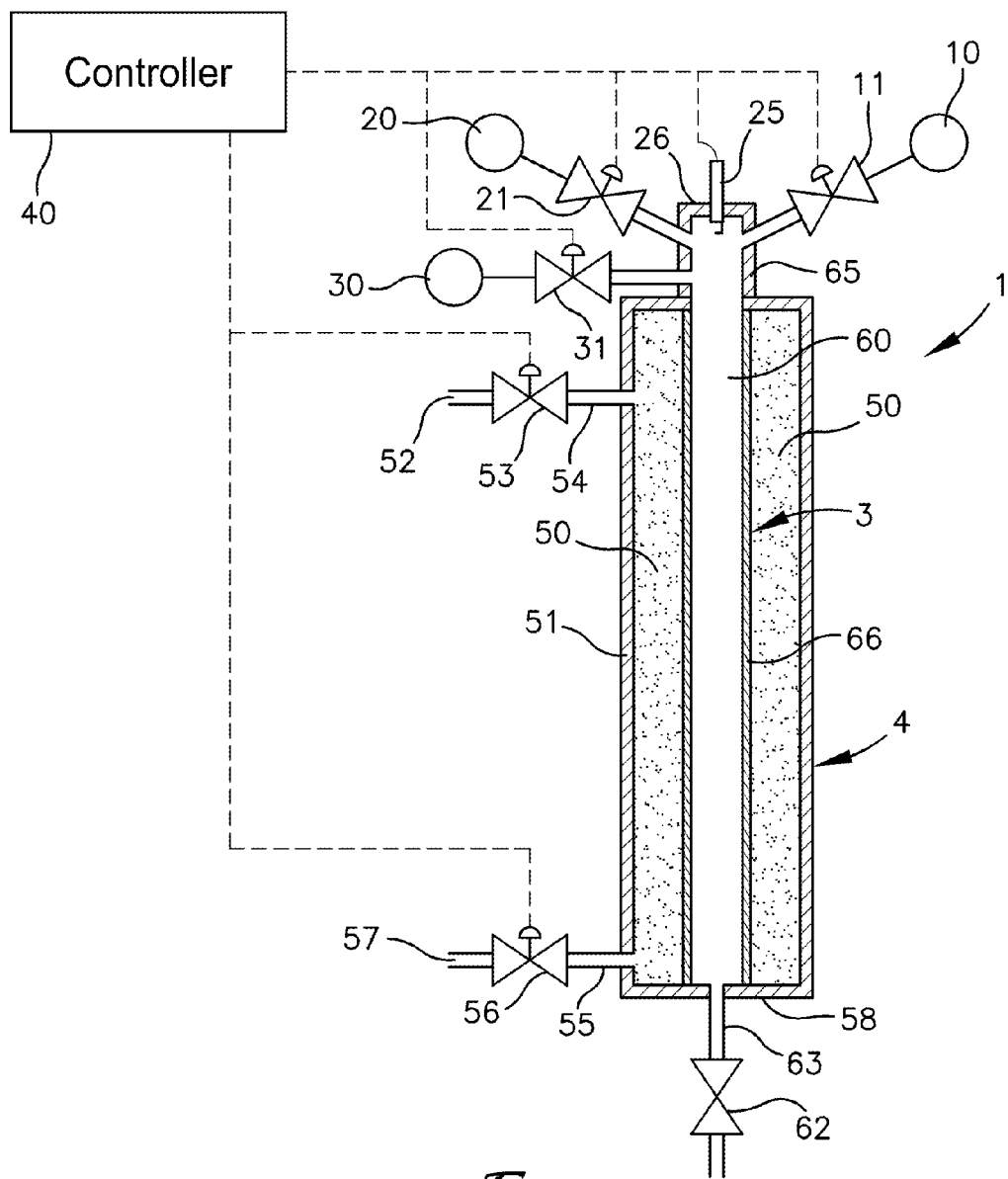
FIG. 5 is a cross-sectional schematic view of a fifth embodiment of the shockwaves processing apparatus in which the shockwaves generation chamber is an inner cylindrical section of the shockwaves processing chamber.

In the embodiment shown schematically in FIG. 5, cylindrical walls of a shockwaves generation section 3 are made from two cylindrical sections 65 and 66, where the wall section 65 is preferably made from high impedance materials such as steel, Inconel, tungsten carbide and the section 66 is preferably made from a low impedance material such as aluminum, carbon or silica based composites, ceramic and ceramic based composite materials designed to contain multiple detonations and where the wall section 66 is designed to allow efficient shockwaves transmission into a processing chamber 50. Another example of a material with high tensile strength and low impendence that allows efficient transmission of shockwaves that can be used for construction of the wall section 66 of the shockwaves generation section 3 is carbon composite material. In this case the inner walls of the shockwaves generation chamber 60 can be coated or cladded with metal, ceramic or other material with high thermal stability to protect carbon and elastomeric materials of the carbon composite from exposure to high temperature detonation products and from oxidation.

Shown in FIG. 5 the external surface of the wall 66 is fully or partially immersed into the processed media contained in the chamber 50. Shown in FIG. 5 the cylindrical wall 51 of the processing chamber 50 can be made from high acoustic impedance materials such as steel or tungsten carbide to enhance efficiency of reflection of the shockwaves emitted through the wall 66 of the shockwaves generation chamber which will cause additional exposure to the shockwaves to the material located in the chamber 50. Alternatively, the cylindrical wall 51 of the processing chamber 50 can be made from the materials such as aluminum, nylon, polyethylene, acrylic and other polymers, carbon based composite and other low acoustic impedance materials in order to reduce reflections of the shockwaves emitted through the wall 66. The shockwaves processing in the apparatus 1 designed for the reduced reflections from wall 51 may be necessary for processing materials that are sensitive to the shockwaves or acoustic waves with a particular peak pressure and positive phase duration. Certain types of small microorganisms can be killed when exposed to the shockwaves with high pressure, for example 200 MPa, and short positive phase duration, for example 5 μsec, that can be emitted by shown in FIG. 5 the shockwaves generation section 3. However, when the wall 51 is made from a high impedance material such as steel incident waves transmitted by the wall 66 will be reflected back into the chamber 50 where they can interact with other emitted shockwaves which can create cavitation in the processed liquid or create a modified waves pattern that will lead to the food cells lysis or other undesirable effects. In this case it will be desirable to construct the wall 51 from materials that have impedance equal or similar to the materials located in the processing chamber 50 which will reduce or eliminate reflections resulting in processing only with the waves emitted from the chamber 60. Other elements, operation and materials used for construction of the embodiment shown in FIG. 5, are the same or similar to these described for the embodiment shown in FIG. 1.

A critical benefit of the embodiment shown in FIG. 5 is that its construction leads to the short shockwaves propagation distances, which allows for the more uniform exposure of the processed liquid to the shockwaves even if the shockwave attenuation coefficient in the processed liquid is relatively large. In the embodiment shown in FIG. 5 when detonation wave is propagating along the inner wall 66 of the shockwaves generation section 60 it will create a shockwave or a strong acoustic wave in the processed liquid located along the outer surface of the wall 66. This shockwave or acoustic wave will have cylindrical geometry and its decay will compose from the attenuation in liquid due to absorption and scattering and decay due to geometric spreading. Reducing the distance between the outer surface of the wall 66 and inner surface of the wall 51 one can minimize both geometric decay and acoustic or shockwaves absorption in the liquid. The embodiment shown in FIG. 5 can be especially beneficial for processing liquids or suspension with large attenuation coefficients as compared with water.

Another advantage of the embodiment shown in FIG. 5 is that it allows a simple scale up of the processing systems by increasing the length of the shockwaves processing apparatus 1. The embodiment shown in FIG. 5 will allow generation and emission through the wall 66 shockwaves with peak pressure and impulse that will vary along the length of the wall 66. To allow uniform exposure of processed material to shockwaves one can control the flow of liquid through the volume of chamber 50 in order to assure uniform processing.

Another advantage of embodiment shown in FIG. 5 is that immersion of the shockwaves generation section wall 66 into the liquid in the chamber 50 will lead to cooling of this section of the wall by the flow of the processed liquid and at the same time to heating of the processed liquid by the heat emitted from the shockwaves generation chamber.

It is also envisioned that multiple shockwaves generation chambers can be inserted into a single processing chamber where the external surfaces of the walls of these shockwaves generation chambers are fully or partially immersed into the processed media contained in the shockwaves processing chamber. In this implementation of the current invention the shockwaves in the shockwaves generation chambers will be generated simultaneously, sequentially or in timed manner that in turn will generate shockwaves that will propagate through processed media and undergo constructive or destructive interference that will be used for improved effects in some applications such as particle deagglomeration, cleaning, and cell lysis.

Figure 6:
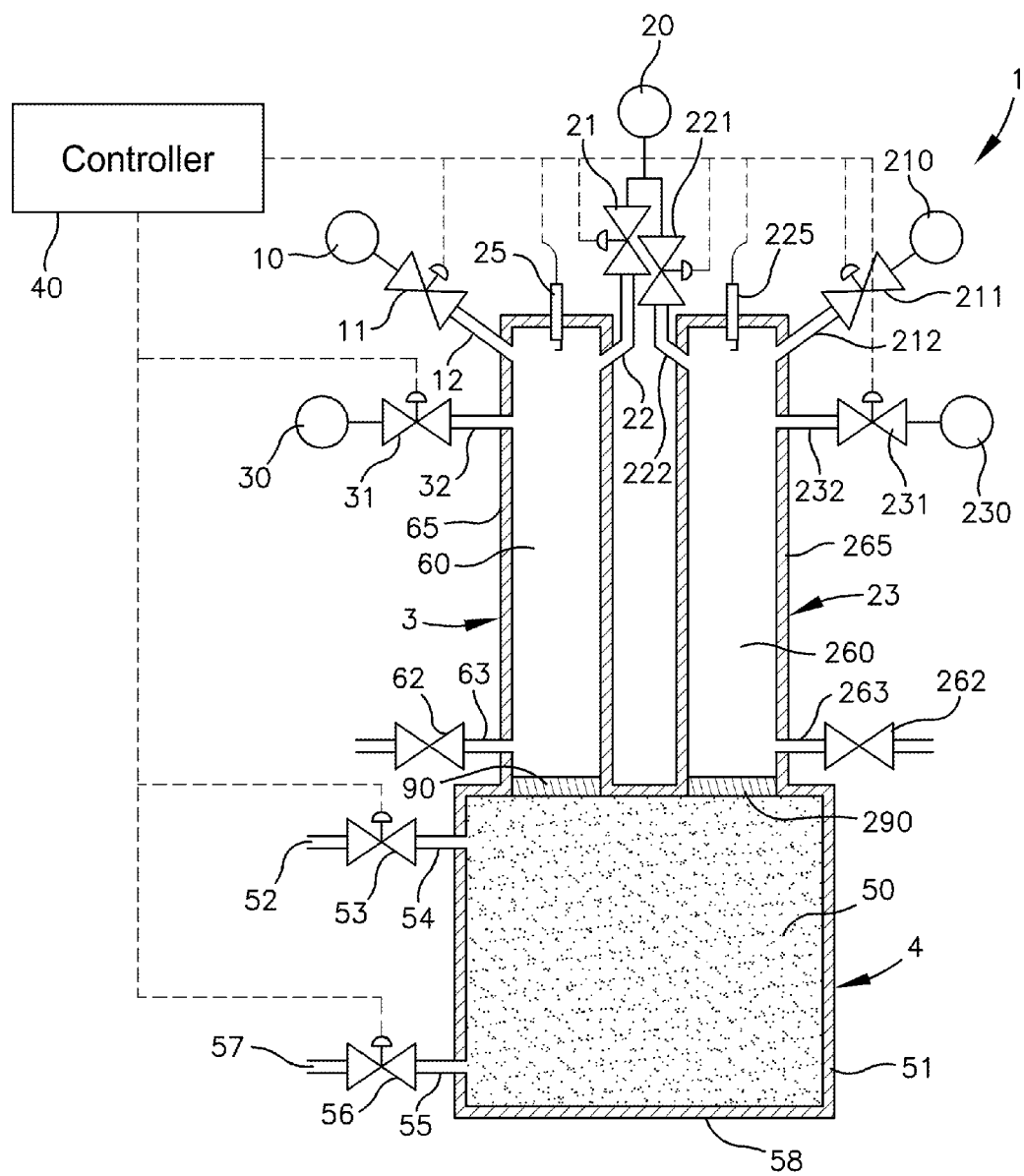
FIG. 6 is a cross-sectional schematic view of a sixth embodiment of the shockwaves processing apparatus in which multiple shockwaves generation chambers generate shockwaves in a single shockwaves processing chamber.

In the embodiment shown schematically in FIG. 6, the shockwaves processing apparatus has a shockwaves generation section 3 that has two shockwaves generation chambers 60 and 260 that are similar in construction to the shockwaves generation chamber shown in FIG. 3. The shockwaves generation chambers 60 and 260 shown in FIG. 6 have a single fuel tank 20 that is used to supply fuel that is injected into the chambers through lines 22 and 222. The fuel injection is controlled by the valves 21 and 221 and the controller 40. The shockwaves generation chambers have also two separate ignition systems 25 and 225 and two oxidizer supply tanks 10 and 210. The embodiment shown in FIG. 6 has also two independent tanks 30 and 230 for the pressurization gas supply. The pressurization gas is injected into the shockwaves generation chambers trough the lines 32 and 232 and the gas injection is controlled by the valves 31 and 231. The pressure relief valves 62 and 262 are used for purge of both the pressurization gas and the detonation products after the detonation phase of the shockwaves generation cycle. It is clear that a single gas supply tanks for each pressurization gas and oxidizer can be used instead of two independent tanks as shown in FIG. 6. In FIG. 6 a membrane 90 is used for transmitting the shockwaves from the shockwaves generation chamber 60 into the processing chamber 50 and a membrane 290 is used for transmitting shockwaves from the shockwaves generation chamber 260 into processing the chamber 50. All the elements of the shockwaves processing section 4 shown in FIG. 6 are the same as in the embodiment shown in FIG. 3. A critical advantage of the embodiment shown in FIG. 6 is that it allows using multiple shockwaves generation chambers for generation of multiple shockwaves used for processing of materials in a single processing volume. These shockwaves can be generated at the same time or at given time intervals and will create a complex pattern of shockwaves propagating through the processed media. Embodiment shown in FIG. 6 will be used to generate constructive and distractive shockwave interferences which will produce large sheer forces that can induce cavitation in liquids. Embodiment shown in FIG. 6 will be used for milling, biological cell lysis, pasteurization and other applications.

As a function of detonation gas containment, shockwave propagation requirements and material properties, the walls 65 and 26 thickness of the shockwaves generation chamber 60 shown in FIGS. 1 to 4 may range from 0.5 mm to 50 cm. As a function of shockwave propagation requirements, device design and material properties, the walls 51 and 58 thickness of the processing vessel 50 shown in FIGS. 1 to 4 may range from 0.5 mm to 50 cm. The geometry of the shockwaves generation chamber 60 can be cylindrical, converging geometry, diverging geometry or combination of converging and diverging geometries.

As an example of one possible configuration of the shockwaves processing apparatus 1, shown schematically in FIG. 3, both shockwaves generation chamber 60 and processing chamber 50 will be cylindrical and will have a 2 cm internal diameter and will be correspondingly 20 cm and 30 cm long. The walls 65 and 51 will be made of a single 6 mm thick stainless steel tube. The endwalls 26 and 58 will be made from stainless steel and be 10 mm thick. The interface 90 will be cylindrical 2 cm in diameter and 5 mm thick made from high thermal resistance silicone based composite.

The geometry of the shockwave processing chamber 50 can be cylindrical, converging geometry, diverging geometry or combination of converging and diverging geometries. Generally, one can use the shockwave processing chamber with a converging geometry in order to generate higher pressure shockwaves toward the distal end 58, or to compensate for the shockwave attenuation that will be especially evident in long shockwaves processing chambers. Using shockwaves processing chambers with a converging geometry where the convergence angle is designed to compensate for shockwaves attenuation in the media will allow uniform exposure of processed media to the shockwaves.

Embodiment shown in FIG. 5 as a function of the detonation gas containment, shockwave propagation requirements and material properties can have the walls 65, 66 and 26 thickness of the shockwaves generation section 3 range from 0.5 mm to 50 cm. As a function of shockwaves propagation requirements, device design and material properties, the walls 51 and 58 thickness of the shockwaves processing section 4 shown in FIG. 5 may range from 0.5 mm to 50 cm. As an example of one possible configuration of the shockwaves processing apparatus 1, shown schematically in FIG. 5, the shockwaves generation chamber 60 will be cylindrical and will have a 3 cm internal diameter and be 150 cm long. The walls 65 and 26 will be made of 10 mm thick tungsten carbide and wall 66 from 5 mm thick aluminum alloy. The endwall 58 will be made from stainless steel and be 10 mm thick. The shockwaves processing section 4 will have a cylindrical processing chamber 50 with 6 cm internal diameter and will be 150 cm long. The wall 51 will be made from 4 mm thick stainless steel, consequently the distance between the external surface of the wall 66 and the internal surface of the wall 51 will be 10 mm and the volume of the processing section in this embodiment will be approximately 2.3 liters.

The various embodiments of the shockwaves processing apparatus, produce high intensity shockwaves in the shockwaves generation chamber 60 that will transmit into liquid or suspension in the processing chamber 50 through an interface, a membrane or directly. The operational parameters such as initial pressure, reactive mixture composition, ignition discharge energy, initial temperature of the reactive mixture, injection and ignition timing are selected so to create the needed processing effect. The shockwaves processing apparatus as disclosed herein provide scalable, safe, and cost effective apparatus and methodology that consists of using a detonable or other reactive mixture that can be repeatedly injected into a shockwaves generation chamber 60 that is designed to contain detonation products and transmit shockwaves into media located in a processing chamber 50. The shockwaves generation chamber 60 of the apparatus 1 can be pressurized with a compressed air at 2 MPa pressure and then filled with a stoichiometric mixture of oxygen and natural gas at 2 MPa initial pressure and approximately 0.03 g/cc initial density. This mixture is detonable thus initiation with the spark plug 25 will cause detonation. The resulting detonation wave will create a shockwave in the shockwaves generation section 3. A detonation wave propagating through a 2 MPa detonable mixture of oxygen and natural gas will have approximately 70 MPa peak pressure, approximately 2 km/sec shockwave velocity, and approximately 0.2 g/cc peak density. Due to use of pressurization air the shockwaves generation cycle can be repeated at 0.001 Hz to 1000 Hz wave generation frequencies.

The amount of shockwave energy transmitted to the media located in the shockwaves processing section 4 is a function of the media impedance. In one example of operational parameters of apparatus 1 shown in FIG. 2 and FIG. 4 where the detonation driven shockwave propagates through a converging nozzle 100 and then impact the surface of the interface 90 in chamber 50. For the given above detonation wave parameters the nozzle 100 can be designed so that at the distal end of the nozzle 100 the peak shockwave pressure will be 175 MPa. If the liquid in the processing chamber 50 is water and the interface 90 designed to efficiently transmit shockwaves, a 175 MPa incident shockwave will generate a hydrodynamic shockwave with the peak pressure of approximately 350 MPa. This shockwave will propagate through water in the chamber 50 and will result in killing of most microorganisms such as gram positive and gram negative bacteria, disrupting various types of algae and producing other mechanical, chemical and biological effects that are know to be caused by shockwaves. Appropriate selection or reactive mixture, initial pressure and shockwaves generation chamber/nozzle design will allow generation of hydrodynamic shockwaves in the processing chamber 50 shown in FIGS. 1 to 4 for example with pick pressure over 700 MPa which will be most efficient for the shockwaves processing of liquids, suspensions, pastes pasteurization and sterilization.

The physical, biological and chemical effects produced by the shockwaves are function of both peak pressure and shockwave impulse. The peak pressure of the shockwaves propagating in the shockwaves generation chamber 60 are mostly controlled by the initial density, pressure, energy density of the reactive mixture and the chamber geometry. The shockwave impulse is a function of the parameters of the detonable mixture as well as design of the shockwaves generation chamber 60. Various embodiments of the shockwaves processing apparatus illustrated in FIGS. 1 to 6 allow design of the shockwaves generation section 3 where standard methods can be suitably selected by persons skilled in the art with the aid of no more than routine experimentation to produce impulse and shockwave structure in term of pressure time history that is most appropriate for the processing needs. For example, for the embodiment shown in FIG. 3 doubling the length of the shockwaves generation chamber 60 while keeping all other parameters identical will approximately double the impulse of the shockwaves transmitted into processing chamber 50. Alternatively reducing the length of the shockwaves generation chamber 60 will reduce the shockwave impulse approximately proportional to the length reduction.

Examples of use of various embodiments of the processing apparatus disclosed herein include:

Food pasteurization and sterilization
Nucleation of polymers
Cell lysis
Inactivation of pathogens used for vaccine preparation
Inactivation of cancer cell for immunotherapy
Genetic transfection
Processing that increase cells permeably
Processing of seeds in water or other solutions to increase germination
Processing of waste suspension to increase methane production
Milling
Homogenization
Processing to control fermentation
Processing for scientific experimentation There are critical advantages in the use of shockwaves processing apparatus according to present invention.

One of the critical advantages of shockwaves processing technology according to the present invention is to allow processing large volumes of liquid or liquid suspension media at approximately uniform processing conditions which is very important for a number of applications such as material processing, pasteurization, cell lysis and fermentation control. In contrast to shockwaves generated by electric discharge, focusing of piezo actuators, laser irradiation and solid explosion all of which produce highly non uniform shockwave energy profiles, where there is high shockwave energy density in a small region and shockwave pressure rapidly decays away from the center of this region. Also in contrast with other shockwaves generation methods that use laser irradiation or small electrical discharges, shockwave processing according to present inventions when implemented according to embodiments shown in FIGS. 2 to 6 will not have harmful thermal effect to the proceed media, that can be detrimental for food processing for example.

Another critical advantage of the present invention is its scalability to a wide range of sizes based on processing needs. The sizes of the shockwaves generation section 3 and the shockwaves processing section 4 in the embodiments shown schematically in FIGS. 1 through 6 can be selected to accommodate processing needs in terms of shockwaves amplitude and duration required to produce needed processing effect. For example, and without limitation, the shockwaves generation chamber 60 and the processing chamber 50 each can have volumes of 1 $cm^3$ to 1000 $cm^3$ for generation of shockwaves and processing liquids in a small scale shockwave processing apparatus that is used for scientific or industrial tests or 1 liter to 10000 liters for a shockwaves processing apparatus used for industrial pasteurization of milk or juice. Without limitation, the length of the shockwaves generation chamber 60 and wall 65 can be 1 cm to 10 m long and 1 mm to 5 m diameter, where the length of the processing chamber 50 and wall 51 can also be 1 cm to 10 m long and 1 mm to 5 m diameters. Based on processing needs, the shockwaves generation chamber 60 and the processing chamber 50 may have one of the following: equal volumes; the shockwaves generation chamber may have a volume that is larger than the processing chamber; or the shockwaves generation chamber may have a volume that is smaller than that of the processing chamber.

The critical advantage of the present invention is its ability to generate shockwaves and acoustic waves with a wide range of parameters that will be used for pasteurization, cell lysis, milling, waste processing and other processing using shockwaves. The shockwaves generation chamber 60 can be filled with detonable reactants to provide a detonable mixture with an initial density that may range from 0.1 to 1800 kg/m3. Reaction of this mixture in a detonative process or other rapid reaction process in the shockwaves generation chamber will generate shockwaves and/or acoustic waves in the processing chamber 50 with peak pressure in the range of 1 to 5000 mega pascals (MPa) and, preferably, between 10 and 2000 MPa. Using standard methods these shockwaves can be designed to have positive phase duration of 10 nanoseconds to 1 millisecond.

The design of the shockwaves generation chamber 60 can be implemented in various geometries that allow shockwave reflections and focusing or transmitting with different shockwave or acoustic wave profiles of pressure as a function of time. The design of the processing chamber 50 can be implemented to allow focusing and multiple reflections of the transmitted shockwaves that can enhance the efficiency of the shockwaves processing.

To facilitate pressure containment and reflections of the shockwaves the shockwaves generation chamber can be made for example from materials with high strength and high impedance, such as metals, cermets, ceramics, polymers, fiber based composites, and combination thereof.

To facilitate transmission of the shockwaves from the shockwaves generation chamber to the processing chamber the membrane or other material that serves as an interface between the reaction products of the shockwaves generation chamber and the liquid of the processing chamber can be made for example from materials with high strength and low impedance, such as polymers, suitable fiber-based composites, and thin high-strength materials such as steel and combinations thereof allowing wave transmission from the shockwaves generation chamber to the processing chamber.

To facilitate multiple reflections of transmitted into liquid shockwaves and acoustic waves that will reduce shockwave energy losses, the walls of the components of the processing chamber can be made for example from materials with high impedance such as tungsten, tungsten carbide, steel, cermets, ceramics, and combinations thereof. To increase wave reflection effectiveness, the wall thickness of the shockwaves generation and processing chambers can be suitably selected by persons skilled in the art.

To enhance the killing of microorganisms and/or to take advantage of increased cell walls permeability, prior to treatment with the shockwaves processing apparatus, the liquid or liquid suspension to be treated may be injected with small gas bubbles, drugs, viruses, genome segments, chemicals, nanoparticles and other reagents. The gas bubbles will reduce effective impedance of the processed media and produce additional sheer force on bacteria during and after shockwave propagation, and will produce additional shockwaves due to bubble collapse. These effects will lead to enhanced killing of cells or microorganisms. It is understood that air or other gases can be used for generating gas bubbles in processed media.

It is also understood that the shockwaves processing apparatus design without limitation can include multiple shockwaves generation chambers operating simultaneously or with a pre-determined time delay that are used for processing materials in a single processing chamber as shown in FIG. 6. These multiple shockwaves generation chamber can have a single or multiple ignition sources, use single or multiple fuel, oxidizer, and pressurization gas sources. Use of multiple shockwaves generation chamber can be used to create a spectrum of shockwaves in the processing chamber with deferent parameters, to increase intensity of processing by the interacting shockwaves and high amplitude acoustic waves, to increase shockwaves generation frequency and thus processing capacity of the shockwaves processing system. A person skilled in the art can also design a shockwaves processing apparatus with multiple shockwaves generation chambers that generate shockwaves in the processing chamber that can propagate in normal direction to each other or at some predetermined angle allowing generation of the high intensity shockwaves and acoustic waves as a result of constructive and destructive interference between the waves that are emitted into a processing chamber. The interfering waves can be also beneficial for producing sheer force that will be effective for milling, cell lysis and killing microorganisms.

It is also understood that the shockwaves processing apparatus can be implemented in cylindrical, conical, semi-spherical forms or in form of a prism.

It is also understood that for specific processing need multiple shockwaves processing devices can operate simultaneously, with or without synchronized time delay.

It is also understood that for controlling gas, liquid and liquid suspension injection and gas relief processes persons skilled in the art may select valves of different construction such as solenoid valves, rotary valves, piezoelectric valves and others. A person skilled in the art can also design operation of the shockwaves processing apparatus where some or all valves will be replaced by properly designed openings in the walls of the chambers that will control for example pressure relief of the exhaust gas. The detonation ignition process can be facilitated by various ignition methods such as a spark plug, laser, glow plug and plasma jet ignition.

It is also understood that multiple solenoid valves and/or purge valves can be used, instead of single valves for a particular processing function shown in FIGS. 1 to 6. For example, multiple purge valves attached to multiple openings can be used to assure rapid purge of gas from the shockwaves generation chamber 60. Multiple valves operating simultaneously or with a designed time sequence can be used for the pressurization gas, oxygen and fuel injection to increase injection flow rate, reduce thermal load and increase process reliability.

It is also understood that it is possible to implement pressurization phase of the shockwave generation cycle by injection of ether oxidizer or fuel trough oxidizer or fuel feed lines thus avoiding a separate injection of the pressurization gas. This form of implementation will use more expensive gases and will be less efficient in purging of the detonable products and in avoiding self-ignition.

While particular embodiments of the present invention have been described and illustrated, it should be understood that the invention is not limited thereto since modifications may be made by persons skilled in the art. The present application contemplates any and all modifications that fall within the spirit and scope of the underlying invention disclosed and claimed herein.

The invention claimed is:

1. A method for processing liquids, liquid suspension, colloids, gels, pastes comprising the steps of:
providing an apparatus comprised of a shockwaves generation section with a shockwaves generation chamber; a shockwaves processing section with a shockwaves processing chamber;
placing media to be processed into the shockwaves processing section through continuous or intermittent injection;
introducing a pressurizing gas capable of preventing self-ignition of reactive mixture into the shockwaves generation section through continuous or intermittent injection;
introducing a mixture comprised of a detonable mixture or a reactive mixture into the shockwaves generation section;
causing formation of at least one of a shockwave within the shockwaves generation section by igniting the detonable mixture or causing a reaction of the reactive mixture so that at least one of a shockwave or an acoustic wave propagates from the shockwaves generation section into the shockwaves processing section;
utilizing physical, chemical, biological or mechanical effects of the shockwave, shockwaves or acoustic waves propagating in the shockwaves processing section;
venting reaction or detonation products and pressurizing gas from the shockwaves generation section via a pressure relief valve.

2. The method of claim 1, wherein after placing the media to be processed into the shockwaves processing section the procedure of introducing the pressurizing gas followed by introducing detonable mixture causing formation of at least one shockwave and venting detonation products and pressurizing gas is repeated as many times as necessary for achieving a pre-determined degree of processing liquids, liquid suspension, colloids, gels, and pastes located in the shockwaves processing section.

3. The method of claim 1, wherein the reactive mixture introduced into the shockwaves generation section undergoes at least one process selected from the group consisting of detonation, deflagration, transition from deflagration to detonation, rapid decomposition, and combinations thereof that result in the formation of at least one shockwave in the shockwaves generation section.

4. The method of claim 1, wherein the pressurizing gas is air, nitrogen, oxygen or any other gas or mixture of gases that prevent self-ignition of the detonable or reactive mixture injected into the shockwaves generation section.

5. The method of claim 1, wherein one or a number of components of the detonable mixture are heated or cooled before injection into the shockwaves generation chamber.

6. The method of claim 1, wherein the pressurizing gas is heated or cooled before injection into the shockwaves generation chamber.

7. The method of claim 1, wherein the pressurizing gas is formed by injection of liquid into the shockwaves generation section and evaporation of said liquid.

8. The method of claim 1, wherein the pressurizing gas is a multiphase media containing liquid phase, solid phase, or liquid and solid phase components.

9. The method of claim 1, wherein unprocessed media is cooled or heated before introduction into the shockwaves processing chamber.

10. The method of claim 1, wherein the detonation or reactive products and the pressurizing gas are exhausted through a single or multiple solenoid valves, piezoelectric valves, mechanical valves or orifices.

11. The method of claim 1, wherein the shockwaves processing section has a geometry selected from the group consisting of a converging geometry, a diverging geometry, and any combination of converging and diverging geometries.

12. The method of claim 1, wherein the shockwaves generation section has a geometry selected from the group consisting of a converging geometry, a diverging geometry, and any combination of converging and diverging geometries.

13. The method of claim 1, wherein the shockwaves generation section is separated from the shockwaves processing section by a movable interface that separate media in the shockwaves generation chamber and the shockwaves processing chamber.

14. The method of claim 1, wherein the shockwaves generation section is separated from the shockwaves processing section by a movable interface that separate media in the shockwaves generation chamber and the shockwaves processing and said movable interface is floating or suspended on the surface of the processed media and fully or partially seals the shockwaves processing chamber.

15. The method of claim 1, wherein the shockwaves generation section is separated from the shockwaves processing section by a membrane made of materials that facilitate containment of pressure and at least partially transmit one of the shockwaves or acoustic waves.

16. The method of claim 1, wherein the shockwaves generation section is separated from the shockwaves processing section by a membrane made of materials that facilitate containment of pressure and at least partially transmit at least one of the shockwaves or acoustic waves, and wherein the membrane surface facing the shockwaves generation chamber is fully or partially covered with liquid.

17. The method of claim 1, wherein the shockwaves generation section is made of multiple shockwaves generation chambers used to generate shockwaves and the shockwaves processing section is made of a single processing chamber, wherein igniting the detonable mixture or causing a reaction of the reactive mixture within the respective chambers is performed simultaneously or sequentially in a timed manner with respect to one another.

18. A method for processing liquids, liquid suspension, colloids, gels, pastes comprising the steps of:
providing an apparatus comprised of a shockwaves generation section; a shockwaves processing section; wherein the external surface of the wall of the shockwaves generation section is at least partially immersed in the media to be processed;
introducing a pressurizing gas capable of preventing self-ignition of reactive mixture into the shockwaves generation section through continuous or intermittent injection;
introducing a mixture comprised of a detonable mixture or a reactive mixture into the shockwaves generation section;
causing formation of at least one of a shockwave within the shockwaves generation section by igniting the detonable mixture or causing a reaction in the reactive mixture so that at least one of shockwave or acoustic wave propagates from the shockwaves generation section into the shockwaves processing section;

utilizing physical, chemical, biological or mechanical effects of the shockwave, shockwaves or acoustic waves propagating in the shockwaves processing section;

venting reaction or detonation products from the shockwaves generation section via a pressure relief valve and repeating introducing the pressurizing gas followed by the detonable mixture and causing the formation of at least one shockwave as many times as necessary for achieving a pre-determined degree of processing liquids, liquid suspension, colloids, gels, or pastes located in the shockwaves processing section.

19. The method of claim 18, wherein at least one wall of the shockwaves generation section is made of materials that facilitate containment of pressure and at least partially transmit at least one shockwave and acoustic wave, and wherein the external surface of the wall of the shockwaves generation section is at least partially immersed within the media contained in the shockwaves processing section.

20. The method of claim 18, wherein the shockwaves generation section is made of multiple shockwaves generation chambers wherein the external surfaces of the walls of said chambers are at least partially immersed within the media contained within the shockwaves processing section, wherein the walls of the multiple shockwaves generation chambers are made of materials that facilitate the containment of pressure and partially transmit at least one shockwave and acoustic wave, and wherein igniting the detonable mixture or causing a reaction in the reactive mixture within the respective shockwaves generation chambers is performed simultaneously or sequentially in a timed manner with respect to one another.

\* \* \* \* \*